United States Patent

[11] 3,607,501

[72] Inventor Akira Okumura
7-2 Sawaragi-Cho, Takatsuki, Osaka, Japan
[21] Appl. No. 771,928
[22] Filed Oct. 30, 1968
[45] Patented Sept. 21, 1971

[54] METHOD FOR MANUFACTURING HOSE
1 Claim, 7 Drawing Figs.

[52] U.S. Cl. ............................................. 156/143,
156/171, 156/173, 156/190, 156/195, 156/244
[51] Int. Cl. ............................................. B31c 13/00
[50] Field of Search ............................................. 156/143,
171, 173, 184, 176, 190, 195, 244

[56] References Cited
UNITED STATES PATENTS

| | | | |
|---|---|---|---|
| 1,478,083 | 12/1923 | Whitmarsh | 156/171 X |
| 1,974,285 | 9/1934 | Maclachlan | 156/171 X |
| 3,089,535 | 5/1963 | Vohrer et al. | 156/143 X |
| 3,219,738 | 11/1965 | Olson | 156/171 X |
| 3,296,047 | 1/1967 | Parr | 156/143 X |
| 3,325,327 | 6/1967 | Swan | 156/143 |
| 3,336,172 | 8/1967 | Hall et al. | 156/143 |
| 3,367,816 | 2/1968 | Mills et al. | 156/195 X |
| 3,416,982 | 12/1968 | Petzetakis | 156/244 X |
| 3,470,051 | 9/1969 | Meyer | 156/244 X |
| 3,501,359 | 3/1970 | Gillespie et al. | 156/171 X |

Primary Examiner—Carl D. Quarforth
Assistant Examiner—Stephen J. Lechert, Jr.
Attorney—Dawson, Tilton, Fallon & Lungmus ABSTRACT: A method and apparatus for manufacturing a hose free of internal stress but having high flexibility by continuously winding a synthetic resin strip extruded from an extruder in half-molten state around a spiral member on a rotary shaft which has fully been restored by the resiliency of its own to the natural condition after having been spirally wound on the shaft.

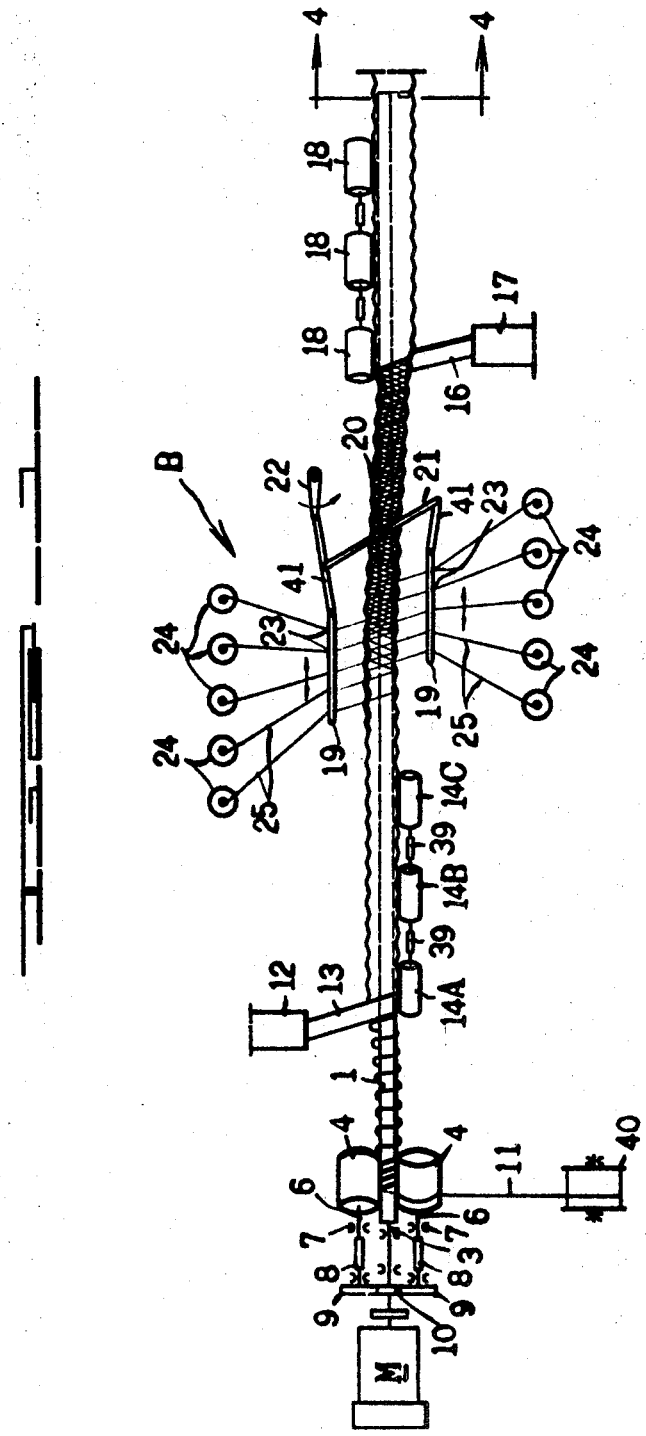

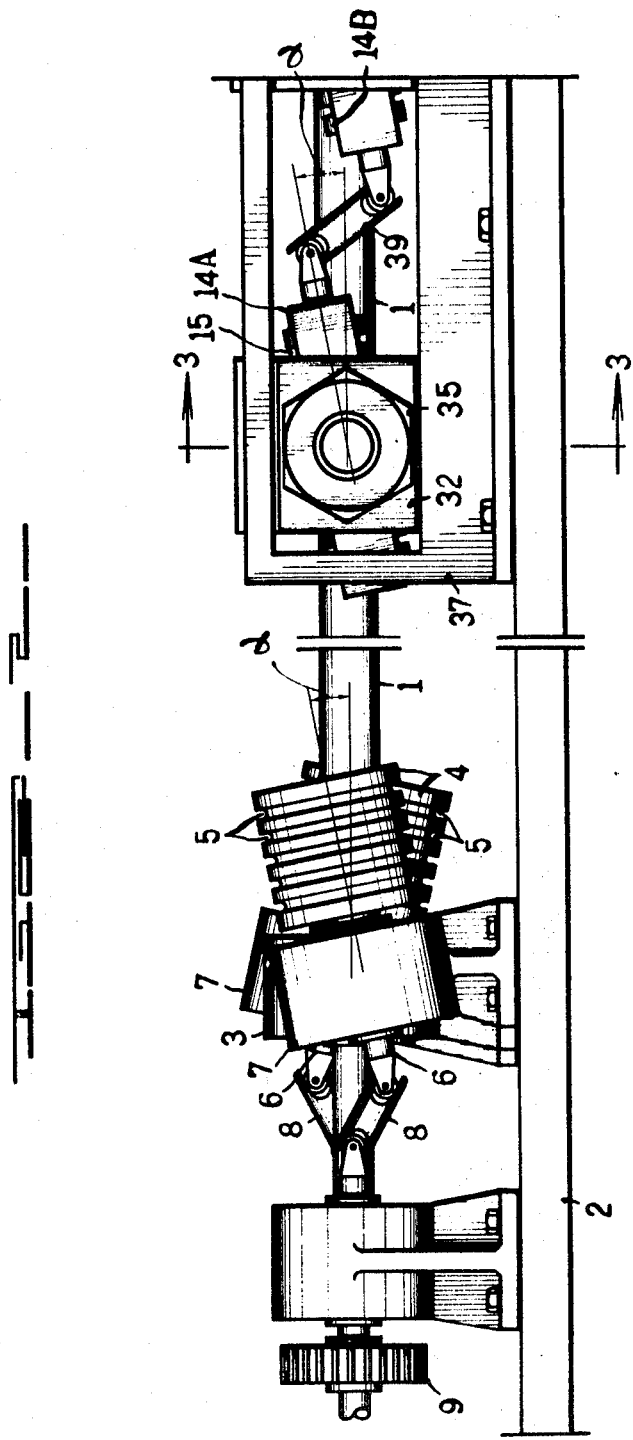

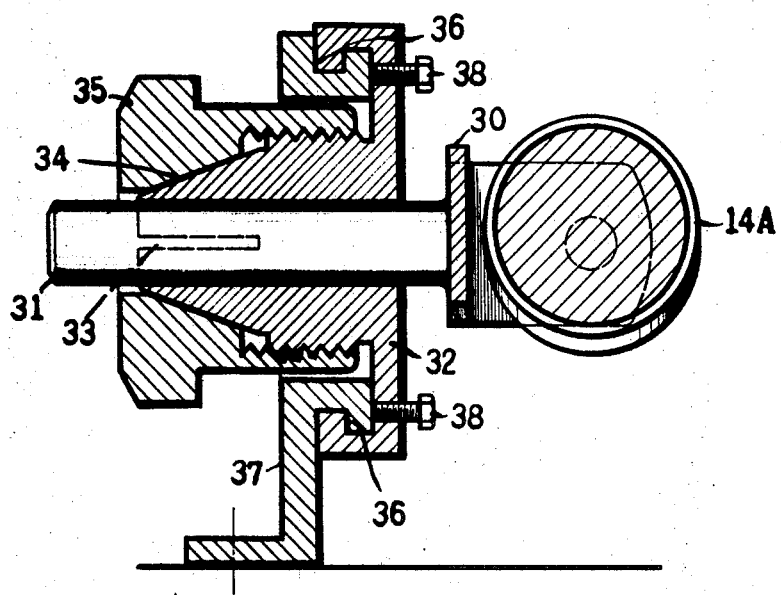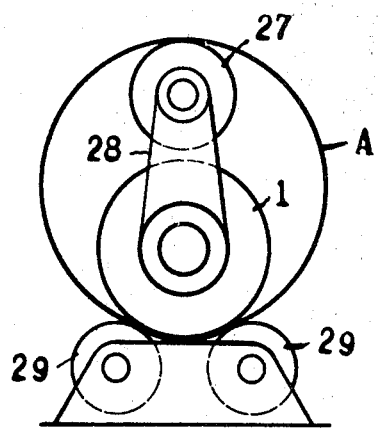

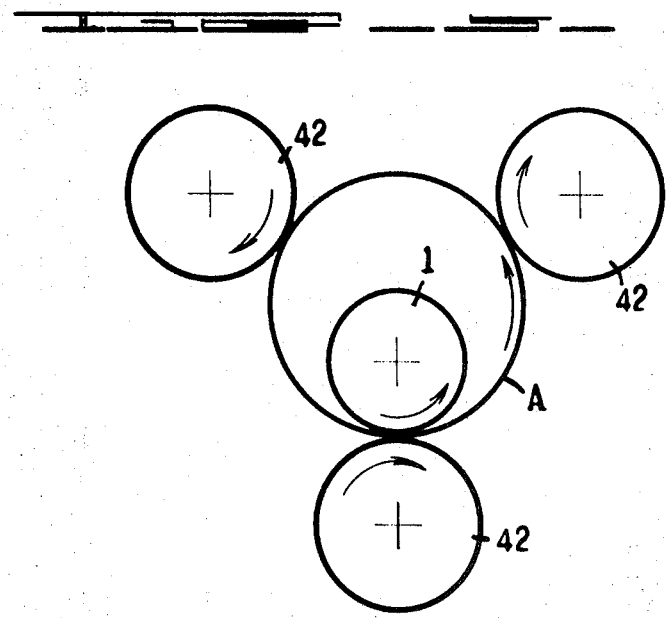
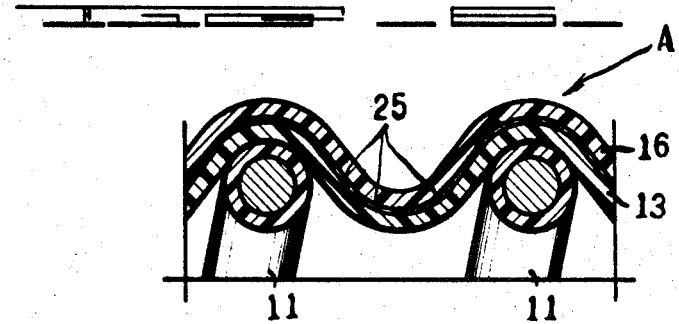
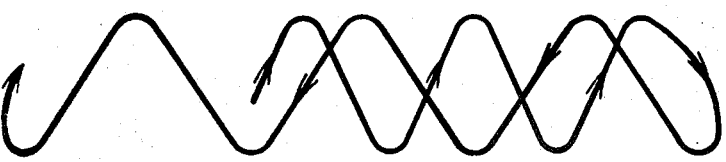

METHOD FOR MANUFACTURING HOSE

The present invention relates to a method and apparatus for manufacturing a hose made of a thermoplastic synthetic resin and having a spiral reinforcing core member therein.

As a method for producing a hose of this type available at present already known is a method in which a hose is made by spirally winding a core member like a piano wire on a length of a rotating shaft and further winding a synthetic resin strip extruded from an extruder around the spiral member. In this case, however, since the strip is wound around the external surface of the piano wire serving as a core member which has been wound around the rotary shaft in snag-fit contact therewith, there remains as an internal stress of the hose the resiliency of the spirally wound core member, namely a restoring force to return the spiral member to a natural position, so that the strength of the matrix of the hose should be such that the internal stress is fully taken into consideration and, due to the internal stress, the service life of the hose becomes inevitably shorter with the flexibility of the hose matrix impaired. In view of the above-mentioned defects, another method has been proposed in which a hose is formed by providing a spiral member which has been fully restored to sufficiently natural condition and winding a strip around the circumferential surface of the spiral member. This method, however, requires two steps in manufacturing hoses and a large length of hose can not be obtained continuously by this method.

Accordingly, a principal object of the present invention is to entirely eliminate the above disadvantages and to provide a method and apparatus for continuously manufacturing in one step a synthetic resin hose having a spiral reinforcing core member and free of internal stress but provided with high flexibility.

More particularly, a principal object of the present invention is to provide a method and apparatus for continuously manufacturing the above-mentioned hose free of internal stress but having high flexibility by continuously winding a synthetic resin strip extruded from an extruder in half-molten state around a spiral member which has been fully restored by the resiliency of its own to a natural condition after having been spirally would in hose manufacturing procedure.

Another object of the present invention is to provide a string-feeding device having a simple structure and capable of effectively winding many pieces of reinforcing string in intersecting manner around the outer circumferential surface of the hose so as to obtain the above described hose having high strength and abrasion resistance.

Other objects and advantages of the present invention will be readily understood from the following detailed description with reference to the drawings given by way of examples, in which:

FIG. 1 is a schematic plan view showing an apparatus in accordance with the present invention;

FIG. 2 is a side elevation on an enlarged scale showing the principal parts of the apparatus of the present invention;

FIG. 3 is a view in section taken along the line 3—3 in FIG. 2;

FIG. 4 is a view in section taken along the line 4—4 in FIG. 1;

FIG. 5 is a schematic front view showing an example of the arrangement of guide rollers in the apparatus of the present invention;

FIG. 6 is an enlarged view in section showing part of hose manufactured by the apparatus of the present invention; and FIG. 7 is a graphic diagram showing the trace of string to be wound around a hose by a string-feeding device in the apparatus of the present invention.

The present invention will now be described with reference to FIGS. 1 and 2. Disposed on a stationary frame 2 is a long rotary shaft 1 which is rotatably supported on a bearing 3 at its one end and adapted to be driven by a motor M. On opposite sides of the base portion of the rotary shaft 1 is mounted a pair of feed rollers 4 and 4 to be driven in a direction opposite to that of the rotary shaft 1. As already shown in FIG. 2, each of the feed rollers 4 is inclined at an angle of inclination $\alpha$ with respect to the tangential direction of the rotary shaft 1 and provided with suitably spaced annular guide grooves 5 in the circumferential surface thereof. An axis 6 of each of the feed rollers is supported on a bearing 7. By means of a universal joint 8 the axis 6 is operatively connected to a gear 9, which is further joined with a gear 10 having a smaller diameter coaxially fixed to the rotary shaft 1. Accordingly, by driving the motor M the rotary shaft 1 and a pair of feed rollers 4 adapted to be driven in a direction opposite to that of the rotary shaft can be simultaneously rotated.

Furthermore, the proportion of the diameter between the gears 9 and the gear 10 on the rotary shaft 1 is so predetermined that the circumferential speeds of the feed rollers 4 and rotary shaft 1 may be the same when they are driven.

In the above apparatus, when a core member 11 which is a piano wire or a piano wire coated with synthetic resin is fed between one feed roller 4 and the rotary shaft 1 from a reel 40, the core member 11, while being spirally wound around the rotary shaft 1, is sent rightward in the drawing due to the effect of the inclination of the aforementioned feed rollers. And immediately upon leaving the feed rollers 4, the spiral member is restored to natural condition due to the resiliency of the material itself, the diameter of the spiral member thereby being enlarged. As illustrated in FIG. 1, around this spiral member is now wound a strip 13 made of synthetic resin and extruded in half-molten state from an extruder 12 with one edge portion thereof overlapped with the other. Indicated as at 14A, 14B and 14C in the drawing are guide rollers which afford assistance to winding operation of strip 13 and serve to continuously move the woundup hose toward the right. Like the feed rollers, each of the guide rollers is provided with a predetermined inclination angle $\alpha$ and annular guide grooves 15 (See FIG. 2) and adapted to be driven by a suitable power source at the same circumferential speed as the rotary shaft 1 but in an opposite direction. Each of the guide rollers is connected to one another by means of a universal joint 39.

It will be readily understood that the strip 13, when fed between the guide roller 14A dna the spiral member with the edge portions overlapped, may be continuously spirally wound around the spiral member while the overlapping edge portions being pressed and joined together by the roller 14A.

At this time, since the rotary shaft 1 has the same circumferential speed as the spiral member, the spiral member, even if it is pressed into contact with a portion of the circumferential surface of the rotary shaft 1, may be rotated at the same circumferential speed as the shaft without giving rise to any abrasion or other troubles therebetween.

Further, in accordance with an embodiment of the present invention illustrated in the drawings, there are provided a string-feeding device B for winding in intersecting manner a number of pieces of string around the outer circumferential surface of the hose thus obtained to enhance the strength, an extruder 17 for further winding a strip 16 on the outer circumferential surface of the hose which has been given a winding operation by the device B, and guide rollers 18 having a structure similar to guide rollers 14A to 14C. The string-feeding device B includes a pair of sliding members 19 adapted for a linear reciprocating movement in the axial direction of the rotary shaft 1, the sliding members 19 being respectively connected through links 41 to the opposite ends of a pivotal rod 21 adapted to be pivotally moved on a supporting point 20. The pivotal rod 21 is so adapted as to be pivotally moved by the rotation of a crank 22. Accordingly, the both of the sliding members 19 can be brought into an alternate reciprocating movement by rotating the crank 22. Furthermore, each of the sliding member 19 is provided with a number of string-feeding openings 23 which are suitably spaced apart and through which pieces of string 25 are fed from respective bobbins 24 onto the circumferential surface of the hose which is being sent forward while rotating. It will be readily understood, therefore, that the string can be wound around the circumferential surface of the hose in crossing manner. In this case each piece of the string 25, while being reciprocated along the axis of the hose, is fed onto the circumferential surface of the hose which is advanced while being rotating, so that a piece of string to be wound around the surface of the hose shows, as it advances, a trace having a small pitch as illustrated in FIG. 7 while the sliding member 19 moves in the same direction as the advancing hose, whereas when the sliding member moves in the direction opposite to the advancing direction of the hose, the string moves backwards to a large extent, leaving a trace with a large pitch. Thus, a piece of string can be wound around the circumferential surface of the hose continuously and in crossing pattern, and by winding a number of pieces of string around the outer surface of the hose in the same manner, a hose having high strength can be obtained.

By spirally winding by the same means as the above-mentioned a strip 16 extruded from the extruder 17 once again over the circumferential surface of the hose having a number of pieces of string thus wound thereon in crossing manner, a flexible hose A made of synthetic resin and having an internal reinforcing core member 11 and reinforcing string 25 wound in crossing pattern as shown in FIG. 6 can be manufactured continuously.

In this case, since the spiral reinforcing core member 11 has fully been restored to the natural condition before the strip 13 is wound, the internal stress of the hose attributable to the resiliency of this reinforcing core member can be perfectly eliminated, which enables to obtain a highly flexible and durable hose in one step of continuous operation.

In order to preclude the deflection of the hose finally obtained, there is provided at the terminal end of the rotary shaft 1 an auxiliary roller 27 for filling the space between the rotary shaft 1 and the finished hose A, the roller 27 being supported on an arm 28 held by the rotary shaft 1 as shown in FIG. 4. Also shown in the same drawing is a pair of receiving rollers 29 and 29 disposed beneath the terminal end of the rotary shaft 1 for supporting the rotary shaft 1 and the finished hose A, the rotary shaft, long as it is, thereby being prevented from drooping by its own weight.

For the adjustment of the inclination angle and the clearance between the guide rollers and rotary shaft, the guide rollers have the following structure.

In order to simplify the explanation, the description will be given with respect to one of the guide rollers with reference to FIGS. 2 and 3. A frame 30 supporting the guide roller 14A is provided, at the rear portion, with a mounting axis 31 extending at a right angle with the rotary shaft 1, which is supported on a receiving member 32 adapted to be laterally moved. The rear portion of the receiving member 32 has a tapering portion 34 having a slitted groove 33 along the axial direction of the axis 31. Screwed onto the receiving member 32 is a clamping nut 35 in snag-fit contact with the tapering portion. By loosening this clamping nut 35, the axis 31 can be released from connection with the receiving member 32, and accordingly, the inclination angle of the guide roller 14A and the clearance between the guide roller and the rotary shaft 1 can be adjusted by turning or axially moving the axis 31. In addition, the receiving member 32 is supported on the stationary base 37 by means of dovetail grooves 36 with bolts 38 securing the member to the base. By loosening these bolts the receiving member 32 can be moved laterally, i.e. in the axial direction of the rotary shaft 1, when so desired. Thus the position of the guide roller can readily be altered.

Although the present invention has been described in detail with respect to an embodiment, it should be understood that the invention is not limited only to such embodiment but it may also reside in all of the alterations, modifications and equivalents within the scope of the appended claims and the spirit of the inventor. As shown in FIG. 5, for instance, plural guide rollers 42 corresponding to the guide rollers 14 and 18 shown in the embodiment may be disposed in suitably spaced relationship on the circumferential surface of the hose A to be manufactured in order to prevent the deflection of the hose A.

What I claim is:

1. A method of manufacturing hose comprising the steps of rotating an elongated cylindrical shaft, feeding a relatively rigid and resilient wire to a guide roller rotatably mounted adjacent the shaft, the axis of the guide roller extending angularly with respect to the axis of the shaft and the guide roller having a plurality of spaced circumferential guide grooves therein, rotating the guide roller in the direction opposite to the direction of rotation of the shaft at about the same circumferential speed as that of the shaft to press the wire against the shaft while advancing the wire axially along the shaft to form a continuous spirally would tensioned wire about the shaft, allowing the tensioned spirally wound wire to expand radially outwardly after it passes axially beyond the guide roller, spirally winding in overlapping fashion a strip of extruded partially molten synthetic resin material about the expanded spirally wound wire, rotating a second guide roller adjacent the spirally wound strip to press the overlapping portions of the strip together and to advance the spirally wound strip axially with respect to the shaft, the axis of the second roller extending angularly with respect to the axis of the shaft, spirally winding in intersecting fashion a plurality of strings about the strip of resin material while reciprocating the strings axially with respect to the shaft to vary the pitch of the strings, spirally winding in overlapping fashion a second strip of extruded partially molten synthetic resin material about the strings in the first strip of resin material, and rotating a third guide roller adjacent the spirally wound second strip to press the overlapping portions of the second strip together and against the strings and the first strip and to advance the spirally wound first and second strips axially with respect to the shaft, the third roller extending angularly with respect to the axis of the shaft.